Patented May 11, 1943

2,318,670

UNITED STATES PATENT OFFICE 2,318,670

METHOD FOR MAKING COMPOSITE MATERIALS

Thomas F. Carruthers, South Charleston, and William N. Stoops, Charleston, W. Va., assignors to Carbide and Carbon Chemicals Corporation, a corporation of New York No Drawing. Application May 21, 1940, Serial No. 336,356

17 Claims. (Cl. 28—75)

This invention relates to the manufacture of composite materials, and it is directed particularly to the preparation of composite textiles having marked properties of crease resistance, increased strength and retention of shape.

In the manufacture of many kinds of articles which are composed essentially of separate fibers, such as fiber mats, fabrics and the like, it is often desirable to hold the fibers in the shape or form desired by means of some binding or stiffening agent. Ordinarily this may be accomplished by impregnating the cloth, felt or fiber mat with an adhesive, preferably dissolved in a sufficient amount of a solvent to produce a solution which will penetrate between the fibers. Such a treatment, however, tends to fill the interstices of the fabric or mat, reducing its porosity and altering its appearance and properties to an objectionable degree for many uses. These disadvantages have been overcome to a certain extent by interweaving or otherwise commingling threads of a thermoplastic material in the fabric and fusing the threads to the other fibers.

In U. S. Patent No. 2,278,895 of E. W. Rugeley, A. T. Feild, Jr., and J. F. Conlon, composite fibrous articles of this class are described which consist of one or more fibers of any of the well known textiles, such as wool, silk, cotton, linen and rayon, with which have been combined fibers or filaments of a vinyl resin. In the case of woven fabrics or any materials made from a plurality of yarns, the desired properties of crease resistance, increased strength and the like may be obtained by incorporating the vinyl resin in the form of one or more of the individual yarns of the fabric, as distinct from a composite yarn. For example, a cloth may be woven with alternate threads of vinyl resin yarn, or in other combinations. For ribbons, a satisfactory material may be obtained by calendering parallel alternate threads of vinyl resin and another textile, the vinyl resin threads fusing to form a cross binder.

Composite yarns composed of continuous filaments may be made by twisting or doubling the vinyl resin fibers with other continuous filaments such as the cellulose esters, regenerated cellulose, other artificial fibers, spun cotton yarn, or natural fibers such as silk, hemp, flax and the like. However, the fabrication of composite staple yarns is the more easily effected, since the staple vinyl resin fibers may be carded in the proper ratio with whatever other staple fibers are desired, and the composite yarn spun therefrom in the usual manner, or otherwise processed.

Although the relatively low fusing temperature of the vinyl resins permits fibers made from them to be combined with other textile fibers and fused with less possibility of damage to the other fibers due to the heat necessary for fusing, any method whereby the fusion temperature may be temporarily reduced, such as by the incorporation of plasticizers, is highly desirable. However, the softening of thermoplastic materials by means of the usual high-boiling plasticizers has the disadvantage that the softened fibers remain permanently soft and low-fusing and may be deficient in imparting crease resistance and retention of shape to the composite materials. This invention provides a means whereby textile fibers made from the vinyl resins may be temporarily softened prior to and during fusion to the other textile fibers in the material, and after fusion their original hardness and fusion temperature may be restored.

Although fibers of any vinyl resins may be used, the strongest and most durable fibers are made from the vinyl ester resins, especially such as are described in Patent 1,935,577 to E. W. Reid, and these resins may be made by the processes described in that patent or by other means, such as the process described in Patent 2,064,565 to E. W. Reid. Of these resins, which are known as conjoint polymers of vinyl halides with vinyl esters of aliphatic acids, the preferred resins are those which contain from about 50% to about 95% by weight of the halide in the polymer. The particular composition which is most desirable depends upon the nature of the material with which the vinyl resin is to be combined, and its intended use, for increasing the vinyl halide in the polymer increases its fusion temperature. The most desirable resins of this type are made by the conjoint polymerization of vinyl chloride with vinyl acetate, and where high strength is desired, the vinyl chloride in the polymer should be between about 80% and about 95% by weight, and the macromolecular weight not very much lower than about 15,000. Molecular weights referred to herein are those calculated by means of Staudinger's formula from viscosity determinations of solutions of the resin.

The vinyl ester resins may be spun into filaments by the "dry-spinning" process, preferably employing acetone as the solvent, as is described in Patent No. 2,161,766 to E. W. Rugeley, T. A. Feild, Jr., and J. F. Conlon.

In order to impart the characteristics of crease resistance and crease permanence to the finished composite fabric, it is generally necessary that the filaments of the vinyl resin incorporated into the fabric be fused or at least partly fused, thereby bonding the vinyl resin with the other fibers present. Since the vinyl resins described are thermoplastic, the desired shape or crease may be imparted to the fabric at elevated temperatures. According to one form of the present invention, the vinyl resin fibers are temporarily softened by means of a plasticizer for the resin which is at least partially soluble in water. This may be done by immersing the vinyl resin fibers, or the composite textile article (containing the vinyl resin fibers), in a mixture of water and plasticizer, the concentration of the plasticizer in the water and time of immersion being adjusted to provide the desired softening of the fibers. Upon removal from the mixture, the composite article is dried and heated, preferably with pressure, to fuse at least partially the softened vinyl resin fibers. This is most easily accomplished by passing the dried material between heated calendar rolls. After fusion of the vinyl resin fibers, the material is thoroughly washed in fresh water, whereby substantially all of the plasticizer absorbed by the resin is removed. Upon drying, the material has the same characteristics as would be obtained by fusing the vinyl resin fibers in the absence of the plasticizer, but without the impairment to the material that might otherwise be incurred from the higher temperatures necessitated in the absence of the plasticizer.

The plasticizer may be incorporated in the vinyl resin fibers in ways other than by absorption from aqueous solution. It may, for example, be added to the dispersion of the vinyl resin in a solvent prior to the spinning of the fibers. This method has the advantage that the fibers spun from such a dispersion or spinning "dope" may be composited directly with the other textile fibers to form the composite textile material and the latter heated to fuse the plasticized vinyl resin fibers, with the result that the material need be subjected to only one washing operation, which is for the purpose of removing the plasticizer.

Plasticizers for the vinyl ester resins which are suitable for use in this invention are:

Di(methoxyethyl) succinate
Triethylene glycol diacetate
Glyceryl diacetate

In the following examples the textile fibers used were spun from a vinyl resin made by the conjoint polymerization of vinyl chloride with vinyl acetate, containing between 85% and 90% by weight of vinyl chloride in the polymer, and having a macromolecular weight of at least 15,000.

Example 1

Aqueous solutons of triethylene glycol diacetate of 10%, 20% and 30% by weight were prepared. Small skeins of the vinyl resin fiber described were soaked in the solutions for thirty minutes at room temperature, and then air-dried overnight. The quantities of the plasticizer absorbed in each case were determined by weighing the skeins before and after soaking. The plasticized skeins were then soaked in large volumes of water for two 30-minute periods. After each soaking, the skeins were air-dried overnight, and weighed to determine the extent to which the plasticizer had been removed by the water. The percent by weight of resin of plasticizer absorbed from each solution, and the amount removed by soaking in fresh water, are shown in the following table:

| Triethylene glycol diacetate in water solution (per cent by weight) | Plasticizer in vinyl resin fiber | Plasticizer in fiber after water soaking | |
|---|---|---|---|
| | | 1st period | 2nd period |
| | Per cent by weight | Per cent by weight | Per cent by weight |
| 10 | 7.4 | 3.4 | 2.7 |
| 20 | 13.2 | 6.3 | 4.8 |
| 30 | 17.9 | 7.7 | 6.0 |

These skeins were tested qualitatively for adherence to cotton cloth before the plasticizer was washed out, and that under the conditions of the experiment practically the same adherence was obtained at 90° C. for the sample containing 17.9% plasticizer as for an unplasticized skein at 120° C.

Example 2

In addition to triethylene glycol diacetate, the other plasticizers mentioned above were tested in a similar manner. Skeins of the vinyl resin fibers averaging about 3.7 parts by weight were weighed and soaked in about 100 parts by weight of aqueous solutions of the plasticizers for thirty minutes at 20° C. They were then squeezed between cloth to remove the excess liquid, air-dried overnight, and finally dried in an oven at 60° C. for one hour and weighed. The gain in weight indicated the amount of plasticizer absorbed. To remove the plasticizers the skeins were immersed in slowly running water for thirty minutes at 50° C. They were dried as before and again weighed. The second weight represented the amount of plasticizer remaining after washing. The results are given in percent by weight in the following table:

| Plasticizer | Plasticizer in aqueous solution | Plasticizer absorbed | Plasticizer after washing |
|---|---|---|---|
| | Per cent | Per cent | Per cent |
| Glyceryl diacetate | 25.0 | 21.6 | 0.5 |
| Di(methoxyethyl) succinate | 25.0 | 31.1 | 10.4 |

Example 3

A sample of cloth suitable for a collar interliner, in which every third thread in the warp consisted of the vinyl resin fibers described, was used to test the effect of plasticizers on its fusion temperature. Using a Carver press and about 1000 pounds per square inch pressure, it was found that the cloth could be laminated to other materials, and good adherence could be obtained at a temperature of 150° C. without the use of plasticizer. Samples of the unpressed cloth were then soaked for thirty minutes in 25% and 35% solutions by weight of triethylene glycol diacetate and di(methoxyethyl) succinate, respectively. On drying they were found to have absorbed plasticizer as shown in column 2 of the table below. The laminating experiments were then repeated in order to determine the temperature necessary to get adherence equal to that obtained with the unplasticized cloth at 150° C. The results are shown in column 3. These samples of laminated cloth were then soaked forty-five minutes in water at room temperature, dried and weighed. The amount of plasticizer remaining in the cloth is given in column 4, and the amount remaining after a repetition of this washing treatment with a longer period of washing or extraction is shown in column 5.

| 1<br>Per cent plasticizer in water solution | 2<br>Plasticizer abosrbed by cloth | 3<br>Temperature required to laminate cloth | 4<br>Plasticizer in cloth after 45 minutes in water | 5<br>Plasticizer in cloth after 16 hours in water |
|---|---|---|---|---|
|  | Per cent | °C. | Per cent | Per cent |
| Unplasticized | | 150 | | |
| 25% triethylene glycol diacetate | 9 | 120 | 3.5 | Nil |
| 35% triethylene glycol diacetate | 21 | 105 | 14 | 10 |
| 25% di(methoxyethyl) succinate | 11 | 125 | 7 | 5 |
| 35% di(methoxyethyl) succinate | 22 | 105 | 12 | 6 |

Many special uses and adaptations of the materials of this invention will be apparent to those skilled in the art. The procedure by which the vinyl resin fibers may be combined with other textile fibers can be varied in many of its details, and such modifications are included within the invention as defined by the appended claims.

We claim:

1. In the process of making composite textile materials having good shape retention, crease resistance and strength, wherein vinyl resin fibers are combined with other textile fibers, the steps which comprise mixing the vinyl resin fibers with said other fibers while the former contain an at least partially water-soluble vinyl resin plasticizer, in amount sufficient to lower the fusion temperature of the vinyl resin fibers, heating the mixed fibers to a temperature at which said vinyl resin fibers are at least partially fused but insufficient to injure the other fibers thereby imparting crease resistance and crease permanence to the resultant composite textile material, and then washing the mixed fibers in water to remove a substantial proportion of the said plasticizer contained in the vinyl resin fibers, thereby raising the fusion temperature of the vinyl resin fibers in said composite textile material.

2. In the process of making composite textile materials having good shape retention, crease resistance and strength containing vinyl resin fibers and other textile fibers, the steps of mixing said other fibers with fibers of a vinyl resin containing a water-soluble vinyl resin plasticizer for lowering the fusion temperature of the vinyl resin fibers, heating the mixed fibers until at least partial fusion of the vinyl resin fibers occurs, and thereafter removing a substantial proportion of the plasticizer by contacting the mixed fibers with water, thereby raising the fusion temperature of the vinyl resin fibers.

3. In the process of making composite textile materials having good shape retention, crease resistance and strength containing fibers made from vinyl resins substantially identical with those which result from the conjoint polymerization of a vinyl halide with a vinyl ester of an aliphatic acid, containing between about 50% and about 95% by weight of vinyl halide in the polymer, which vinyl resin fibers have a water-soluble vinyl resin plasticizer incorporated therein, the steps of associating such vinyl resin fibers with other textile fibers to form a composite textile material, heating the latter until at least partial fusion of the vinyl resin fibers takes place, and thereafter removing at least a substantial proportion of the plasticizer by bringing the vinyl resin fibers in contact with water, thereby permanently raising the fusion temperature of the vinyl resin in said composite material.

4. Process of making composite textile materials having good shape retention, crease resistance and strength, which comprises dispersing a vinyl resin in a volatile solvent containing an at least partially water-soluble plasticizer for said vinyl resin, forming plasticized vinyl resin filaments from said dispersion, mixing said filaments with other textile fibers, heating the mixed fibers to a temperature at which said vinyl resin filaments are at least partially fused but insufficient to injure the other fibers, and then washing the mixed fibers in water to remove a substantial proportion of the plasticizer contained in said filaments and permanently to raise the fusion temperature of the vinyl resin.

5. In the process of making composite textile materials having good shape retention, crease resistance and strength containing vinyl resin fibers and other textile fibers, the steps of incorporating with the vinyl resin fibers a water-soluble plasticizer for said resin for temporarily lowering the fusion temperature of the resin fibers, heating a mixture of these fibers with said other fibers until at least partial fusion of the vinyl resin fibers takes place, and thereafter removing at least a substantial proportion of the plasticizer by contacting the mixed fibers with water, thereby raising the fusion point of the vinyl resin.

6. In the process of making composite textile materials having good shape retention, crease resistance and strength from vinyl resin fibers wherein such fibers are mixed with other textile fibers, the steps which comprise temporarily reducing the fusion temperature of said vinyl resin fibers by associating therewith an at least partially water-soluble vinyl resin plasticizer in amount sufficient to substantially lower the fusion temperature of the vinyl resin fibers to soften such fibers, heating the mixed fibers to a temperature at which the vinyl resin fibers are at least partially fused but insufficient to injure the other fibers, and thereafter removing at least a substantial proportion of said plasticizer by contacting the mixed fibers with water, thereby raising the fusion temperature of the vinyl resin, and at least partially restoring the original hardness of such resin.

7. Process of making composite textile materials containing vinyl resin fibers and other textile fibers and characterized by their crease-resistance and retention of shape, which comprises incorporating with such vinyl resin fibers a water-soluble plasticizer for said resin for temporarily lowering the fusion temperature of the resin fibers, interassociating such plasticized vinyl resin fibers with said other textile fibers in the fabrication of said composite textile material, heating the last-named material to a temperature at which the vinyl resin fibers are at least partially fused but insufficient to injure the other fibers, thereby producing a crease-resistant composite material, and thereafter contacting such material with water, thereby removing at least a substantial proportion of the plasticizer and raising the fusion temperature of the vinyl resin.

8. In the process of making composite materials containing vinyl resin fibers and other fibers, the steps of mixing with the other fibers vinyl resin fibers that have triethylene glycol diacetate incorporated therein, heating the mixed fibers until at least partial fusion of the vinyl resin fibers takes place to form a composite textile material, and thereafter removing a substantial proportion of the triethylene glycol diacetate by contacting said composite material with water, thereby raising the fusion temperature of the vinyl resin in said composite material.

9. In the process of making composite materials containing vinyl resin fibers and other fibers, the steps of mixing with the other fibers vinyl resin fibers having di(methoxyethyl) succinate incorporated therein, heating the mixed fibers until at least partial fusion of the vinyl resin fibers takes place to form a composite textile material, and thereafter removing a substantial proportion of the di(methoxyethyl) succinate by contacting the composite material with water, thereby raising the fusion temperature of the vinyl resin in said composite material.

10. In the process of making composite materials containing vinyl resin fibers and other fibers, the steps of mixing with the other fibers vinyl resin fibers having glyceryl diacetate incorporated therein, heating the mixed fibers until at least partial fusion of the vinyl resin fibers takes place to form a composite textile material, and thereafter removing a substantial proportion of the glyceryl diacetate by contacting the composite material with water, thereby raising the fusion temperature of the vinyl resin in said composite material.

11. Process of making composite textile materials characterized by their crease resistance and retention of shape, which comprises incorporating with other textile fibers, in the fabrication of the composite material, fibers made from a vinyl resin which may result from the conjoint polymerization of a vinyl halide with a vinyl ester of an aliphatic acid, said resin containing between about 50% and about 95% by weight of the vinyl halide in the polymer and having an average macromolecular weight of at least 15,000; immersing the mixed fibers in an aqueous solution containing a water-soluble plasticizer for the vinyl resin fibers to lower the fusion temperature of the vinyl resin fibers, then subjecting the mixed fibers to heat and pressure whereby the vinyl resin fibers are at least partially fused to the other fibers to form a composite textile material, and thereafter washing the latter in water to remove a substantial proportion of the plasticizer absorbed by the vinyl resin fibers, thereby raising the fusion temperature of the vinyl resin in said composite material.

12. Process of making composite textile materials characterized by their crease resistance and retention of shape, which comprises incorporating fibers made from a vinyl resin which may result from the conjoint polymerization of a vinyl halide with a vinyl ester of an aliphatic acid and containing between about 50% and about 95% by weight of the vinyl halide in the polymer and having an average macromolecular weight of at least 15,000, with other textile fibers in the fabrication of the composite material; immersing the mixed fibers in an aqueous solution containing triethylene glycol diacetate to lower the fusion temperature of the vinyl resin fibers, then subjecting the mixed fibers to heat and pressure whereby the vinyl resin fibers are at least partially fused to the other fibers to form a composite textile material, and thereafter washing the composite material in water to remove a substantial proportion of the triethylene glycol diacetate absorbed by the vinyl resin fibers, thereby raising the fusion temperature of the vinyl resin in said composite material.

13. Process of making from vinyl resin fibers and other textile fibers composite textile materials characterized by their crease resistance and retention of shape, which comprises incorporating with said other fibers, in the fabrication of the composite material, fibers made from a vinyl resin which may result from the conjoint polymerization of a vinyl halide with a vinyl ester of an aliphatic acid, said resin containing between about 50% and about 95% by weight of the vinyl halide in the polymer and having an average macromolecular weight of at least 15,000; immersing the mixed fibers in an aqueous solution containing di(methoxyethyl) succinate to lower the fusion temperature of the vinyl resin fibers, then subjecting the mixed fibers to heat and pressure whereby the vinyl resin fibers are at least partially fused to the other fibers to form a composite textile material, and thereafter washing the composite material in water to remove a substantial proportion of the di(methoxyethyl) succinate absorbed by the vinyl resin fibers, thereby raising the fusion temperature of the vinyl resin in said composite material.

14. Process of making composite textile materials characterized by their crease resistance and retention of shape, which comprises incorporating fibers made from a vinyl resin which may result from the conjoint polymerization of a vinyl halide with a vinyl ester of an aliphatic acid and containing between about 50% and about 95% by weight of the vinyl halide in the polymer and having an average macromolecular weight of at least 15,000, with other textile fibers in the fabrication of the composite material; immersing the mixed fibers in an aqueous solution containing glyceryl diacetate to lower the fusion temperature of the vinyl resin fibers, then subjecting the mixed fibers to heat and pressure whereby the vinyl resin fibers are at least partially fused to the other fibers to form a composite textile material, and thereafter washing the latter in water to remove a substantial proportion of the glyceryl diacetate absorbed by the vinyl resin fibers, thereby raising the fusion temperature of the vinyl resin in said composite material.

15. Process of making composite textile materials characterized by their crease resistance and retention of shape, which comprises incorporating fibers made from a vinyl resin resulting from the conjoint polymerization of vinyl chloride with vinyl acetate and containing between about 50% and about 95% by weight of vinyl chloride in the polymer, with other textile fibers in the fabrication of the composite material; immersing the mixed fibers in an aqueous solution containing triethylene glycol diacetate to lower the fusion temperature of the vinyl resin fibers, then subjecting the mixed fibers to heat and pressure whereby the vinyl resin fibers are at least partially fused to the other fibers to form a composite textile material, and thereafter washing the mixed fibers in water to remove a substantial proportion of the triethylene glycol diacetate absorbed by the vinyl resin fibers, thereby raising the fusion temperature of the vinyl resin in said composite material.

16. Process of making composite textile materials characterized by their crease resistance and retention of shape, which comprises incorporating fibers made from a vinyl resin resulting from the conjoint polymerization of vinyl chloride with vinyl acetate and containing between about 50% and about 95% by weight of vinyl chloride in the polymer, with other textile fibers in the fabrication of the composite material; immersing the mixed fibers in an aqueous solution containing di(methoxyethyl) succinate to lower the fusion temperature of the vinyl resin fibers, then subjecting the mixed fibers to heat and pressure whereby the vinyl resin fibers are at least partially fused to the other fibers to form a composite textile material, and thereafter washing the mixed fibers in water to remove a substantial proportion of the di(methoxyethyl) succinate absorbed by the vinyl resin fibers.

17. Process of making composite textile materials characterized by their crease resistance and retention of shape, which comprises incorporating fibers made from a vinyl resin resulting from the conjoint polymerization of vinyl chloride with vinyl acetate and containing between about 50% and about 95% by weight of vinyl chloride in the polymer, with other textile fibers in the fabrication of the composite material; immersing the mixed fibers in an aqueous solution containing glyceryl diacetate to lower the fusion temperature of the vinyl resin fibers, then subjecting the mixed fibers to heat and pressure whereby the vinyl resin fibers are at least partially fused to the other fibers to form a composite textile material, and thereafter washing the mixed fibers in water to remove a substantial proportion of the glyceryl diacetate absorbed by the vinyl resin fibers.

THOMAS F. CARRUTHERS.
WILLIAM N. STOOPS.